(12) United States Patent
Yamanaka et al.

(10) Patent No.: US 9,266,565 B2
(45) Date of Patent: Feb. 23, 2016

(54) VEHICULAR INSTRUMENT MOUNTING STRUCTURE

(75) Inventors: Kenshi Yamanaka, Nukata-gun (JP); Kouji Hotta, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 203 days.

(21) Appl. No.: 14/116,057

(22) PCT Filed: May 20, 2011

(86) PCT No.: PCT/JP2011/061617
§ 371 (c)(1),
(2), (4) Date: Nov. 6, 2013

(87) PCT Pub. No.: WO2012/160618
PCT Pub. Date: Nov. 29, 2012

(65) Prior Publication Data
US 2014/0084627 A1    Mar. 27, 2014

(51) Int. Cl.
*B60K 1/00* (2006.01)
*B62D 25/08* (2006.01)
*H01M 2/10* (2006.01)
*B60L 1/00* (2006.01)
*B60L 3/00* (2006.01)
*B60L 3/04* (2006.01)
*B60L 11/18* (2006.01)

(52) U.S. Cl.
CPC ............... *B62D 25/082* (2013.01); *B60L 1/003* (2013.01); *B60L 3/003* (2013.01); *B60L 3/0007* (2013.01); *B60L 3/0046* (2013.01); *B60L 3/04* (2013.01); *B60L 11/1868* (2013.01); *B60L 11/1879* (2013.01); *H01M 2/1083* (2013.01); *B60K 1/00* (2013.01); *H01M 2220/20* (2013.01); *H01M 2250/20* (2013.01); *Y02T 10/7005* (2013.01); *Y02T 10/7066* (2013.01); *Y02T 90/32* (2013.01)

(58) Field of Classification Search
CPC ................................ B60R 16/04; Y02E 60/12
USPC ......................................................... 180/68.5
See application file for complete search history.

(56) References Cited

U.S. PATENT DOCUMENTS 6,827,168 B2 *  12/2004  Miyazaki ..................... 180/68.5
8,698,347 B2 *   4/2014  Ishigaki ......................... 307/9.1

(Continued)

FOREIGN PATENT DOCUMENTS

JP      2002-362254 A    12/2002
JP      2006-248313 A     9/2006

(Continued)

*Primary Examiner* — Brodie Follman
*Assistant Examiner* — James Triggs
(74) *Attorney, Agent, or Firm* — Sughrue Mion, PLLC

(57) ABSTRACT

The present invention relates to a vehicular instrument mounting structure in which an auxiliary battery is mounted so as to be as high as a power control device , for protecting the power control device by a protector even when the auxiliary battery interferes with the power control device. The power control device is fastened to the upper surface of a transaxle by a screw via a mounting foot provided in the front-rear direction of the vehicle. The protector for protecting a corner of the power control device is fastened to the power control device and the transaxle by screws for a power control device fastening part and a transaxle fastening part. The power control device has a power cable for supplying power and a discharger for rapid discharge at a time of emergency.

6 Claims, 4 Drawing Sheets

(56) References Cited

U.S. PATENT DOCUMENTS

| | | | |
|---|---|---|---|
| 8,830,686 B2 * | 9/2014 | Nomoto | 361/752 |
| 2002/0191385 A1 | 12/2002 | Miyazaki | |
| 2006/0201753 A1 | 9/2006 | Yamafuji | |
| 2011/0073394 A1 | 3/2011 | Wakatsuki | |

FOREIGN PATENT DOCUMENTS

| | | | |
|---|---|---|---|
| JP | 2007-099239 A | 4/2007 |
| JP | 2007-221962 A | 8/2007 |
| JP | 2009-090818 A | 4/2009 |
| JP | 2009-286206 A | 12/2009 |
| JP | 2010-158991 A | 7/2010 |
| JP | 2011-068229 A | 4/2011 |
| JP | 2001-354040 A | 12/2011 |
| JP | 2012-144227 A | 8/2012 |
| JP | 2012-158312 A | 8/2012 |
| JP | 2012-236539 A | 12/2012 |
| WO | 2012/104721 A1 | 8/2012 |

* cited by examiner

VEHICULAR INSTRUMENT MOUNTING STRUCTURE

CROSS REFERENCE TO RELATED APPLICATIONS

This application is a National Stage of International Application No. PCT/JP2011/061617 filed May 20, 2011, the contents of all of which are incorporated herein by reference in their entirety.

TECHNICAL FIELD

The present invention relates to a vehicular instrument mounting structure for mounting an instrument in a vehicle, and in particular to a vehicular instrument mounting structure for mounting a power control device.

BACKGROUND ART

Conventionally, there have been known a pure electric vehicle in which the vehicle is driven using a driving force of a motor generator; a hybrid vehicle being driven by a combination of an engine, or an internal combustion engine, and a motor generator; and a fuel cell vehicle that is driven using power generated by a fuel cell, and so forth. Such a vehicle has a power control device, such as a booster converter, an inverter, and so forth, that receives power from a main battery or a fuel cell and controls power supply to the motor generator.

A power control device is also referred to as a PCU (a power control unit) for controlling a high voltage and a large current to be supplied to a motor generator, and needs to be mounted in an engine compartment in the vicinity of the motor generator. Therefore, in a hybrid vehicle that activates an engine by a motor generator, an engine activating auxiliary battery is mounted in a baggage compartment, as the auxiliary battery neither supplies power to a cell motor nor needs to be placed in the vicinity of the engine, and a space to place a PCU in an engine compartment needs to be ensured.

In recent years, size reduction of a high voltage instrument makes it possible to place an auxiliary battery in the vicinity of a power control device in an engine compartment. For example, Patent Document 1 discloses a technique for fastening a power control device reduced in size to a transaxle, in which the power control device has double axial first and second motor generators and a differential gear, and drives the first and second motor generators, the second motor generator being placed in parallel to the axis of the first motor generator, and the differential gear being placed on a third axis in parallel to these double axes.

However, in placing an auxiliary battery in the vicinity of a power control device, it is necessary to avoid interference between the auxiliary battery and the power control device, in order to ensure smooth protection of the power control device and smooth and rapid discharge from the power control device in the event of collision of the vehicle. In view of the above, Patent Document 2 discloses a separation mechanism for causing a relay box to move upward to be separated from the vehicle by a load transmitted via a guide surface from the auxiliary battery that moves backward upon invasion of a barrier (an obstacle) in a collision of the vehicle. Such a relay box separation structure can prevent interference between a vehicular instrument and other components that move upon application of an impact in a collision, whereby shock absorbing capability can be enhanced.

While damage resulting from a broken auxiliary battery is rather small as the auxiliary battery is at a rather low voltage; namely, 12 volts, it is desired to minimize damage to the power control device for controlling a high voltage of a few hundreds of volts. In view of the above, Patent Document 3 discloses an instrument mounting structure for protecting a power control device itself in a collision of a vehicle, in which the power control device is mounted such that the front end thereof is placed at a position more rearward in the vehicle than the front end of the transaxle, and a motor compressor is placed on a vehicle rearward side relative to the power control device.

Patent Document 4 discloses an inverter separation mechanism for protecting a power control device itself, such as an inverter or the like, by separating an inverter and an inverter bracket from an inverter tray mounted on a front member upon application of an external force to the inverter in a collision.

RELATED ART DOCUMENT

Patent Documents

Patent Document 1: Japanese Patent Laid-open Publication No. 2001-354040
Patent Document 2: Japanese Patent Laid-open Publication No. 2002-362254
Patent Document 3: Japanese Patent Laid-open Publication No. 2010-158991
Patent Document 4: Japanese Patent Laid-open Publication No. 2009-90818

SUMMARY

Problem to be Solved by the Invention

The above-mentioned Patent Documents disclose a technique for fastening a power control device to a transaxle. However, in a layout in which a vehicle mounted instrument, such as an auxiliary battery or the like, is mounted on a vehicle forward side relative to the power control device because of positional relationship with other instruments, a corner of the auxiliary battery that has relatively higher strength partially contacts the power control device, and a reaction force is exerted on the case of the power control device. Once the reaction force exceeds the rigidity of the case of the power control device, a circuit inside the power control device is broken. That is, such a layout may make it difficult to achieve rapid discharge, using a circuit inside the power control device, and insulation from a high voltage part in a collision.

In view of the above, a vehicular instrument mounting structure according to the present invention relates to a vehicular instrument mounting structure including a vehicle mounted instrument, such as an auxiliary battery or the like, mounted so as to be as high as a power control device, for protecting the power control device, using a protector, even when the auxiliary battery should interfere with the power control device.

Means to Solve the Problem

In order to achieve the above-described object, a vehicular instrument mounting structure according to the present invention comprises a power control device fastened to a transaxle; a mounted device placed diagonally ahead of the power control device in relation to a vehicle running direction so as to be as high as the power control device; and a protector positioned between the mounted device and the power control device, and mounted on the power control device so as to reduce a load that is applied to the power control device when the mounted device is caused to move to collide against the power control device by an impact load, wherein one end of the protector is fastened to the transaxle, and another end thereof is fastened to an upper part of the power control device.

In a vehicular instrument mounting structure according to the present invention, the power control device may be fastened to the transaxle by a screw member, an upper part of a lateral surface of the transaxle may be fastened to the one end of the protector by a screw member, and an upper part of a lateral surface of the power control device may be fastened to the other end of the protector by a screw member.

In a vehicular instrument mounting structure according to the present invention, the mounted instrument may include an auxiliary battery. Note that the mounted device may include an auxiliary battery, a relay box, a reserve tank, an electric motor air compressor, an electric power steering motor, an air filter box, and so forth.

In a vehicular instrument mounting structure according to the present invention, the protector may protect an area extending from a part of a front surface of the power control device to a part of a lateral surface of the power control device, and a corner of the protector may receive an initial load in a diagonal collision that is a collision at a diagonal front of the vehicle.

In a vehicular instrument mounting structure according to the present invention, a fastening part that fastens the power control device and the protector and a fastening part that fastens the transaxle and the protector may be positioned on the lateral surfaces of the power control device and the transaxle.

In a vehicular instrument mounting structure according to the present invention, the protector may be placed covering a cable extending from the power control device to the transaxle.

Advantage of the Invention

A vehicular instrument mounting structure according to the present invention can prevent movement of a power control device even when the respective fastening parts that fasten a transaxle and a protector and a power control device and the protector, respectively, receive an impact load from a vehicle-mounted instrument, such as an auxiliary battery, the mounted instrument thereupon moves toward the power control device, and fastening between the power control device and the transaxle is thus broken due to the impact load. Further, according to this vehicular instrument mounting structure, by fastening the transaxle to the power control device by a screw member, the protector to the power control device by a screw member, and the power control device to the protector by a screw member, it is possible to achieve ready mounting and removal. Still further, as a screw functions as a projection, it is possible to reduce an impact load applied to the protector by cracking in advance a mounted-instrument that collides against the protector so that the mounted-instrument itself is broken by an impact load.

Further, according to this vehicular instrument mounting structure, as the respective fastening parts that fasten the transaxle and the protector and the power control device and the protector, respectively, are positioned on the side of the auxiliary battery, there can be provided an effect that a load received by the protector from the side of the auxiliary battery is dispersed into the transaxle and the power control device to protect the power control device, and also to prevent fastening of the protector itself from being cut off to consequently prevent movement of the power control device. Still further, protection of the power control device facilitates rapid discharge and insulation from a high voltage part.

BEST MODE FOR CARRYING OUT THE INVENTION

In the following, the best mode for carrying out the present invention (hereinafter referred to as an embodiment) will be described with reference to the drawings.

Figure 1:
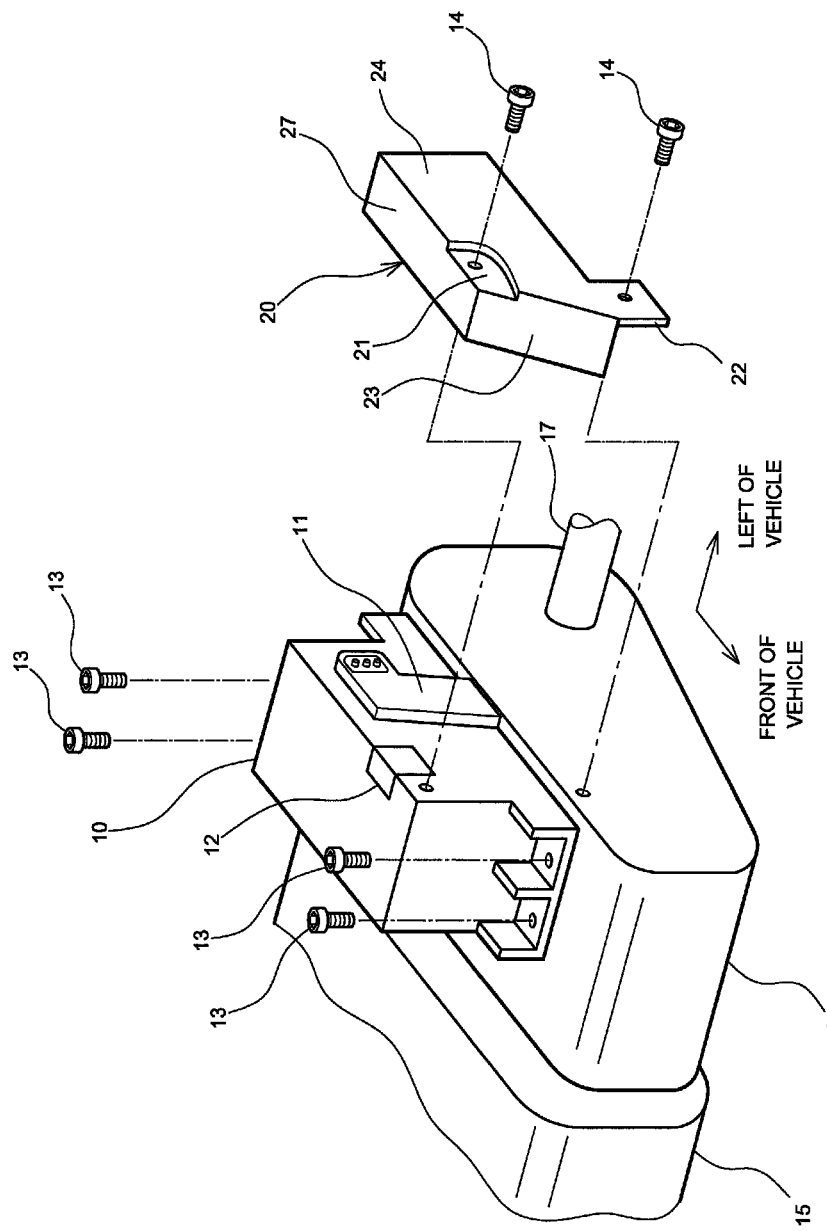
FIG. 1 is a perspective view schematically showing mounting of a power control device according to an embodiment of the present invention.

FIG. 1 schematically shows mounting of a power control device 10 fastened to a transaxle, with a protector 20 removed for description. A transaxle 16 is connected to an engine 15 and a wheel shaft 17, and the power control device 10 is mounted on the transaxle 16. The power control device 10 is fastened to the upper surface of the transaxle 16 by four screws 13 via a mounting foot provided in the front-rear direction of the vehicle, and the protector 20 for protecting a corner of the power control device 10 is fastened to the power control device 10 and the transaxle 16 by screws 14 inserted into a power control device fastening unit 21 and a transaxle fastening unit 22, respectively. Further, the power control device 10 has a power cable 11 for supplying power and a discharger 12 for rapid discharge in the event of an emergency.

The protector 20 has three protection panels; namely, a front panel 23, a side panel 24, and an upper panel 27, and is made by, for example, processing of heat rolled steel of about three millimeters thickness. Heat rolled steel has a higher degree of deformation, compared to the case of the power control device 10, and is capable of bearing a tension load even while deforming to a great extent. Further, the protector 20 is prepared for collision against an auxiliary battery by increasing the strength due to three bent parts including one between the front panel 23 and the side panel 24, one between the front panel 23 and the upper panel 27, and one between the side panel 24 and the upper panel 27, and further modifies a stress by ensuring a larger dent radius (dent R). Still further, the side panel 24 covers the power cable 11 for preventing damage caused by the power cable 11 being hooked.

Figure 2:
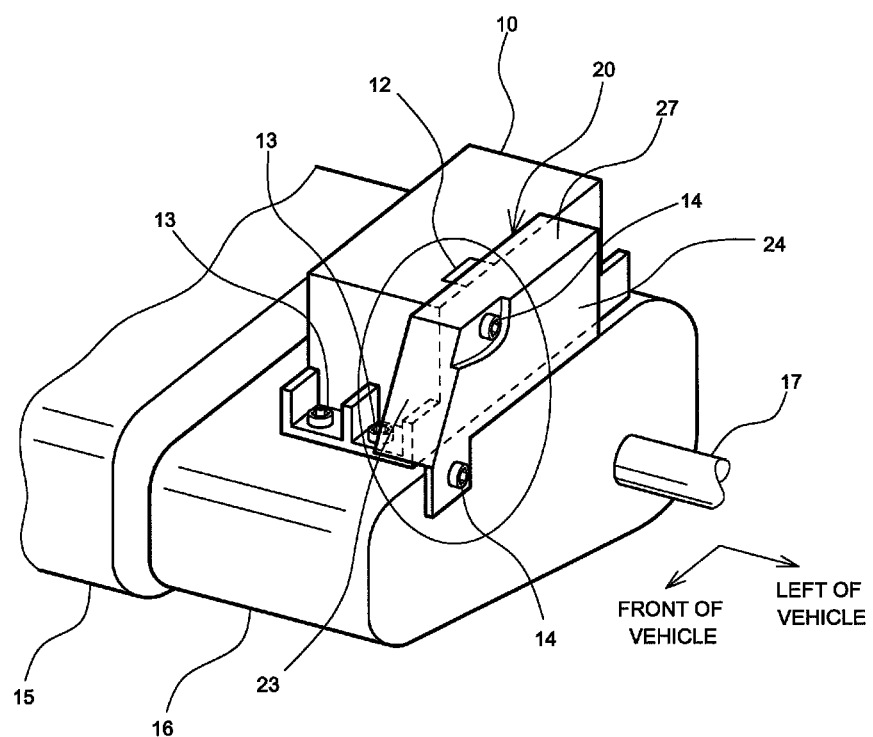
FIG. 2 is a perspective view showing the power control device according to the embodiment of the present invention.

FIG. 2 shows the power control device 10 having the protector mounted thereon. Note that reference numerals already described will not be described again. The part enclosed by the oval in FIG. 2 constitutes a triangular connection structure using three screws (13, 14) to reinforce the fastening part. A first screw is a screw 13 for fastening the transaxle 16 and the power control device 10; a second screw is a screw 14 for fastening the transaxle 16 and the protector 20; a third screw is a screw 14 for fastening the power control device 10 and the protector 20. Further, as the front panel 23 of the protector 20 is positioned close to a mounting foot reinforcing rib, the reinforcing rib is brought into contact with the front panel 23 when the front panel 23 is deformed due to a load applied in a collision, causing a part near the mounting foot to be connected to the front panel 23 of the protector 20, whereby reinforcement is further enhanced.

The protector 20 is placed so as to disperse a load applied thereto into the power control device 10 and the transaxle 16 to be borne by the respective elements. As a result, in the collision range indicated by the oval in FIG. 2, the protector 20 sequentially deforms before breakage of the case of the power control device 10, and the load can be dispersed into the respective fastening parts. Further, as a space is ensured between the side panel 24 and the lateral surface of the power control device 10, a load transmitted from the side panel 24 comes to gradually be applied to the lateral surface of the power control device 10, accompanied by deformation of the protector 20, to thus be transmitted at moderate force. This makes it possible to avoid rapid application of a load into a single point on the power control device 10, thereby making breakage of the case unlikely.

FIGS. 3(A) to FIG. 3(C) show a situation in which an auxiliary battery 25, or a mounted instrument, collides against the power control device 10 mounted on a right front side of the body 30. Note here that a mounted instrument may be any of an auxiliary battery, a relay box, an air filter box, a reserve tank, an electric motor air compressor, and an electric power steering motor, the latter two having little restriction on a mounting position, and so forth, although an auxiliary battery 25 is used here for description. As shown in FIG. 3(A), the auxiliary battery 25 is mounted on aside member 40 and thus is almost as high as the power control device 10. The power control device 10 is positioned further rearward than the front end of the transaxle 16. In a head-on collision, for example; that is, a collision at the front of a vehicle, as a barrier 26'does not invade beyond the front end of the transaxle, and the auxiliary battery 25 moves rearward in the vehicle together with the side member 40, the auxiliary battery 25 does not damage the power control device 10. On the contrary, in a diagonal collision, as shown in FIG. 3(B), in which a barrier 26 collides at a diagonal front part of a vehicle, a rotational moment is applied to the auxiliary battery 25 as the side member 40 deforms, and strongly interferes with the power control device 10. A lateral surface of the auxiliary battery 25 contacts the protector 20 of the power control device 10 and the projection of the screw, and the auxiliary battery 25 is pressed onto the protector 20. As a corner of the protector 20 has a higher strength than that of the case of the auxiliary battery 25, the protector 20 breaks the auxiliary battery 25 before breakage of the power control device 10, to thereby absorb a load. Further, the discharger 12 is activated after collision to discharge the charge stored in the power control device 10.

The protector 20 connects the power control device 10 and the transaxle 16 at a position in the vicinity of a mounting foot for fastening the power control device 10 and the transaxle 16. This makes it possible for the protector 20 to receive a compression and tension load even when the mounting foot should be broken, to thereby prevent separation of the power control device 10. Below, a collision without a protector will be described.

Figure 4:
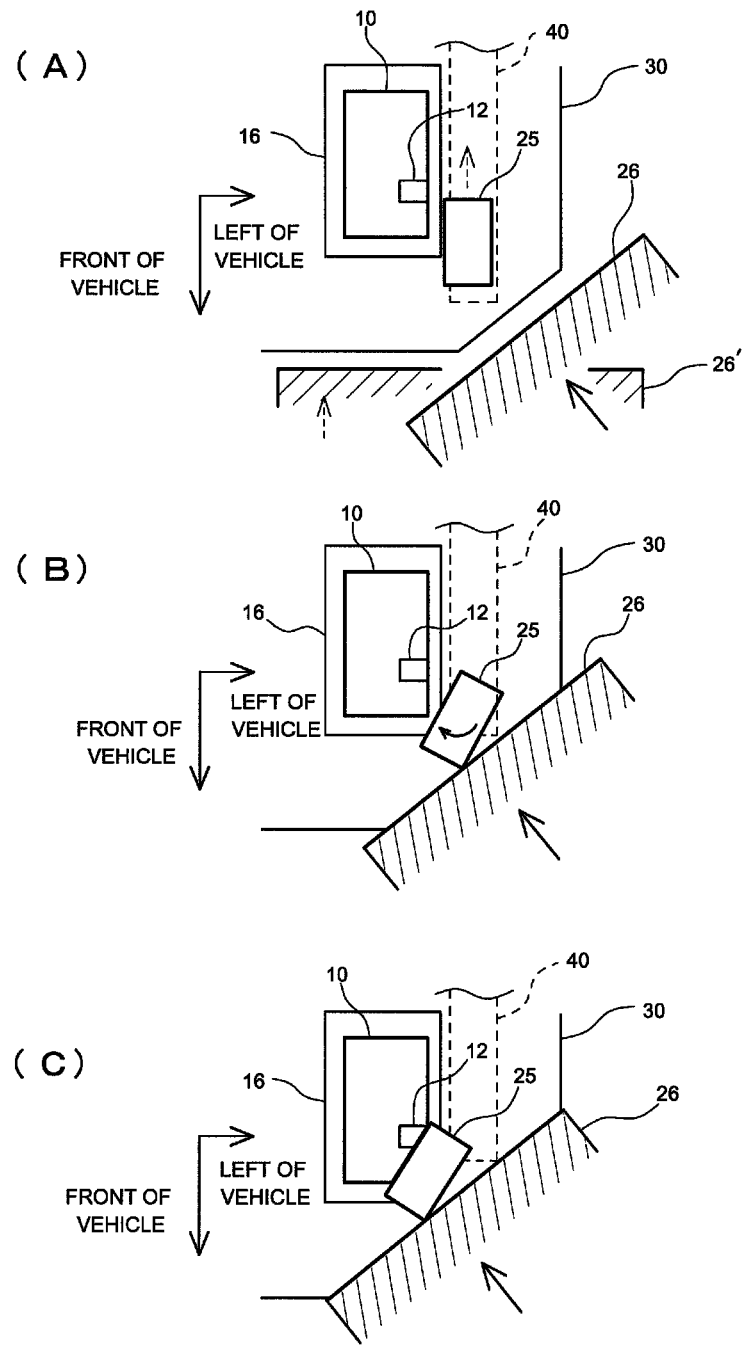
FIG. 4 explains a situation in which an auxiliary battery collides against a power control device having no protector.

FIGS. 4(A) to 4(C) show a right front side of the body 30, showing in particular a situation in which an auxiliary battery collides against the power control device having no protector.

Figure 3:
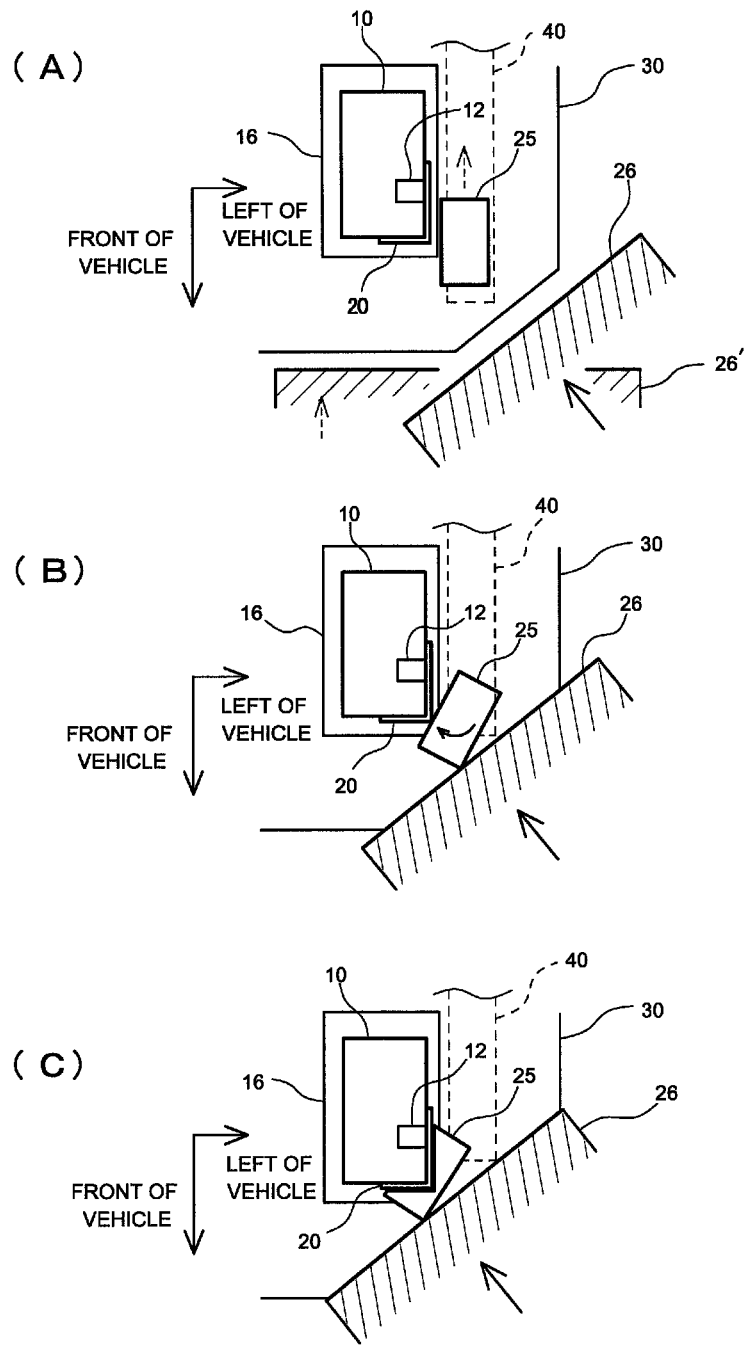
FIG. 3 explains a situation in which an auxiliary battery being a mounted instrument collides against the power control device shown in FIG. 1.

As having been outlined by reference to FIG. 3, in a head-on collision, or the like, as the barrier 26' does not invade beyond the front end of the transaxle, and the auxiliary battery 25 moves rearward in the vehicle together with the side member 40, the auxiliary battery 25 does not damage the power control device 10. On the contrary, in a diagonal collision, or the like, as a rotational moment is applied to the auxiliary battery 25 as the side member 40 deforms, the barrier 26 strongly interferes with a corner of the power control device 10. Therefore, as shown in FIG. 4(B), the power control device 10 starts to be gradually broken, beginning with a corner thereof, which leads to breakage of the discharger 12 as well, as shown in FIG. 4(C), so that the discharge capability of the power control device 10 is lost.

Originally, it is desired to minimize damage to the power control device 10 for controlling a high voltage of a few hundreds of volts, while keeping damage limited to the auxiliary battery 25 of a relatively low voltage; namely, about 12 volts. In view of the above, in this embodiment, in order to achieve controlled damage as described above, the protector 20 for modifying a load input to the power control device 10 to protect the power control device 10 is placed on a part where the power control device 10 interferes with the auxiliary battery 25.

As described above, according to a vehicular instrument mounting structure according to this embodiment, it is possible to prevent movement of the power control device even when the auxiliary battery moves toward the power control device as the respective fastening parts that fasten the transaxle and a protector and the power control device and the protector, respectively, receive a load from the auxiliary battery, and the fastening with the power control device and the transaxle is cut off due to the load. Note that a load mentioned here refers to a collision load generated in a collision or a compression or tension load applied to a protector or the like.

Further, as the respective fastening parts that fasten the transaxle and the protector and the power control device and the protector are positioned on the side of the auxiliary battery, it is possible to disperse a load received by the protector from the auxiliary battery side into the transaxle and the power control device to thereby protect the power control device, and also to prevent fastening of the protector itself from being cut off to consequently prevent movement of the power control device.

Note that in this embodiment, the description is made by reference to the diagrams showing a power control device fastened to a transaxle by four screws and a protector fastened to the transaxle and the power control device by two screws. This fastening condition is not limiting, and a rivet or fitting may be employed for fastening. Further, a fastening condition appropriate for a vehicle may be selected. For example, one end of the protector is fastened to the power control device by a screw or a rivet, while the other end of the protector is bent to be mounted between the transaxle and the power control device. Still further, although heat rolled steel is used to make a protector in this embodiment, this is not limiting, and any material that is less likely to break compared to the case of the power control device and is readily deformed is preferable.

Brief Description Of Reference Numerals 10 power control device, 11 power cable, 12 discharger, 13, 14 screw, 15 engine, 16 transaxle, 17 wheel shaft, 20 protector, 21 power control device fastening part, 22 transaxle fastening part, 23 front panel, 24 side panel, 25 auxiliary battery, 26 barrier, 27 upper panel, 30 body.

The invention claimed is:

1. A vehicular instrument mounting structure, comprising:
a power control device fastened to a transaxle;
a mounted device placed laterally outside of the power control device and in front of the power control device in relation to a vehicle running direction; and
a protector positioned between the mounted device and the power control device, and including a front panel for covering a front surface of the power control device and a side panel for covering a lateral surface, in which the front panel and the side panel are bent to form a corner, whereby the power control device is protected from an impact of the mounted device in the event that there is a collision at a front corner of the vehicle and the mounted device moves while rotating toward the power control device, wherein one end of the protector is fastened to the transaxle, and another end thereof is fastened to an upper part of the power control device.

2. The vehicular instrument mounting structure according to claim 1, wherein the power control device is fastened to the transaxle by a screw member, an upper part of a lateral surface of the transaxle is fastened to the one end of the protector by a screw member, and an upper part of a lateral surface of the power control device is fastened to the other end of the protector by a screw member.

3. The vehicular instrument mounting structure according to claim 1, wherein the mounted device is an auxiliary battery.

4. The vehicular instrument mounting structure according to claim 2, wherein a fastening part that fastens the power control device and the protector and a fastening part that fastens the transaxle and the protector are positioned on the lateral surfaces of the power control device and the transaxle.

5. The vehicular instrument mounting structure according to claim 2, wherein the protector is placed covering a cable extending from the power control device to the transaxle.

6. The vehicular instrument mounting structure according to claim 1, wherein the protector is made of a material that is more elastically deformable than a material that a case of the power control device is made of.

\* \* \* \* \*